United States Patent
Zahirovic et al.

(10) Patent No.: US 11,816,259 B2
(45) Date of Patent: Nov. 14, 2023

(54) METHODS AND SYSTEMS FOR FORMING IMAGES OF EYE FEATURES USING A NON-IMAGING, SCANNING-MEMS-BASED EYE-TRACKING SYSTEM

(71) Applicant: AdHawk Microsystems Inc., Waterloo (CA)

(72) Inventors: Nino Zahirovic, Waterloo (CA); Brendan Redmond O'Hanlon, Prescott (CA); Fan Yang, London (CA); Niladri Sarkar, Waterloo (CA)

(73) Assignee: AdHawk Microsystems Inc., Waterloo (CA)

( * ) Notice: Subject to any disclaimer, the term of this patent is extended or adjusted under 35 U.S.C. 154(b) by 0 days.

(21) Appl. No.: 18/098,899

(22) Filed: Jan. 19, 2023

(65) Prior Publication Data

US 2023/0161408 A1  May 25, 2023

Related U.S. Application Data

(63) Continuation of application No. 17/673,337, filed on Feb. 16, 2022, now Pat. No. 11,586,285.

(60) Provisional application No. 63/150,312, filed on Feb. 17, 2021.

(51) Int. Cl.
| | |
|---|---|
| *G06F 3/041* | (2006.01) |
| *G06F 3/01* | (2006.01) |
| *G02B 26/10* | (2006.01) |
| *G02B 26/08* | (2006.01) |

(52) U.S. Cl.
CPC ......... *G06F 3/013* (2013.01); *G02B 26/0833* (2013.01); *G02B 26/101* (2013.01)

(58) Field of Classification Search
CPC ... H01L 27/3276; H01L 27/32; H01L 27/323; H01L 51/5237; G06F 3/0412; G06F 3/047
See application file for complete search history.

(56) References Cited

U.S. PATENT DOCUMENTS

| | | | |
|---|---|---|---|
| 5,638,176 A | 6/1997 | Hobbs et al. | |
| 7,388,699 B1 | 6/2008 | Coffee | |
| 10,824,229 B2 | 11/2020 | Sarkar | |
| 10,908,683 B2 | 2/2021 | Sarkar et al. | |
| 11,048,327 B2 | 6/2021 | Yang et al. | |
| 11,262,577 B2 | 3/2022 | Sarkar et al. | |
| 11,379,035 B2 | 7/2022 | Sarkar | |

(Continued)

OTHER PUBLICATIONS

Final Rejection dated Jun. 15, 2020 for U.S. Appl. No. 15/876,148.

(Continued)

*Primary Examiner* — Pegeman Karimi
(74) *Attorney, Agent, or Firm* — KAPLAN BREYER SCHWARZ, LLP

(57) ABSTRACT

Aspects of the present disclosure describe systems, methods, and structures that provide eye-tracking by 1) steering a beam of light through the effect of a microelectromechanical system (MEMS) onto a surface of the eye and 2) detecting light reflected from features of the eye including corneal surface, pupil, iris—among others. Positional/geometric/feature/structural information pertaining to the eye is determined from timing information associated with the reflected light.

19 Claims, 9 Drawing Sheets

(56) References Cited

U.S. PATENT DOCUMENTS

| | | |
|---|---|---|
| 11,435,823 B2 | 9/2022 | Sarkar et al. |
| 2002/0014579 A1 | 2/2002 | Dunfield |
| 2004/0061831 A1 | 4/2004 | Aughey et al. |
| 2004/0120023 A1 | 6/2004 | Bush et al. |
| 2007/0001248 A1 | 1/2007 | Geisberger et al. |
| 2007/0081241 A1 | 4/2007 | Hayashi |
| 2008/0266818 A1 | 10/2008 | Collet et al. |
| 2009/0062658 A1 | 3/2009 | Dunki-Jacobs et al. |
| 2013/0242364 A1 | 9/2013 | Kilcher et al. |
| 2015/0047078 A1 | 2/2015 | Sarkar et al. |
| 2015/0235355 A1 | 8/2015 | Mullins |
| 2016/0029883 A1 | 2/2016 | Cox |
| 2016/0166146 A1* | 6/2016 | Sarkar .............. G02B 26/101 351/210 |
| 2016/0240013 A1 | 8/2016 | Spitzer |
| 2017/0038253 A1 | 2/2017 | Mallinson |
| 2017/0067609 A1 | 3/2017 | Ichikawa et al. |
| 2017/0115483 A1 | 4/2017 | Aleem et al. |
| 2017/0123489 A1 | 5/2017 | Guenter |
| 2017/0364732 A1 | 12/2017 | Komogortsev |
| 2018/0189977 A1 | 7/2018 | Zecchini et al. |
| 2018/0210547 A1 | 7/2018 | Sarkar |
| 2019/0120940 A1 | 4/2019 | Pei et al. |
| 2019/0204913 A1 | 7/2019 | Sarkar et al. |
| 2019/0286228 A1* | 9/2019 | Sangu .............. G02B 27/0172 |
| 2019/0369253 A1* | 12/2019 | Aleem ................ G01S 17/66 |
| 2021/0303064 A1 | 9/2021 | Yang et al. |
| 2021/0344302 A1* | 11/2021 | Brunner .............. H03B 5/30 |
| 2022/0252868 A1 | 8/2022 | Sarkar et al. |
| 2022/0261074 A1 | 8/2022 | Zahirovic et al. |
| 2022/0382370 A1 | 12/2022 | Strathearn et al. |

OTHER PUBLICATIONS

Final Rejection received for U.S. Appl. No. 15/876,148, dated Aug. 23, 2019, 11 pages.

Jacob Engelberg et al., "The Advantages of metalenses over diffractive lenses," "Nature Communications", vol. 11, dated 2020, (https://doi.org/10.1038/s41467-020-15972-9), 4 pp.

Non-Final Office Action received for U.S. Appl. No. 15/876,148, dated Feb. 24, 2020, 15 pages.

Non-Final Rejection dated Apr. 29, 2021 for U.S. Appl. No. 16/232,410.

Non-Final Rejection dated Jan. 7, 2022 for U.S. Appl. No. 17/143,048.

Non-Final Rejection dated Jun. Jun. 18, 2020 for U.S. Appl. No. 16/236,993.

Non-Final Rejection dated Oct. 27, 2020 for U.S. Appl. No. 16/234,293.

Non-Final Rejection dated Sep. 3, 2021 for U.S. Appl. No. 17/087,302.

Non-Final Rejection received for U.S. Appl. No. 15/876,148, dated May 3, 2019, 9 pages.

Notice of Allowance and Fees Due (PTOL-85) dated Jul. 16, 2020 for U.S. Appl. No. 15/876,148.

Notice of Allowance and Fees Due (PTOL-85) dated Mar. 23, 2022 for U.S. Appl. No. 17/087,302.

Notice of Allowance and Fees Due (PTOL-85) dated Mar. 5, 2021 for U.S. Appl. No. 16/234,293.

Notice of Allowance and Fees Due (PTOL-85) dated May 18, 2022 for U.S. Appl. No. 17/143,048.

Notice of Allowance and Fees Due (PTOL-85) dated Oct. 19, 2022 for U.S. Appl. No. 17/673,337.

Notice of Allowance and Fees Due (PTOL-85) dated Oct. 7, 2020 for U.S. Appl. No. 16/236,993.

Notice of Allowance dated Oct. 20, 2021 for U.S. Appl. No. 16/232,410.

Notice of Allowance received for U.S. Appl. No. 17/673,337, dated Oct. 27, 2022, 2 pages.

Zhaoyi Li et al., "Meta-Optics achieves RGB-achromatic focusing for virtual reality," Science Advances, vol. 7, No. 5, Jan. 27, 2021, (www.doi.org/10.1126/sciadv.abe4458), 8 pp.

Non-Final Rejection dated Mar. 3, 2023 for U.S. Appl. No. 17/344,046.

* cited by examiner

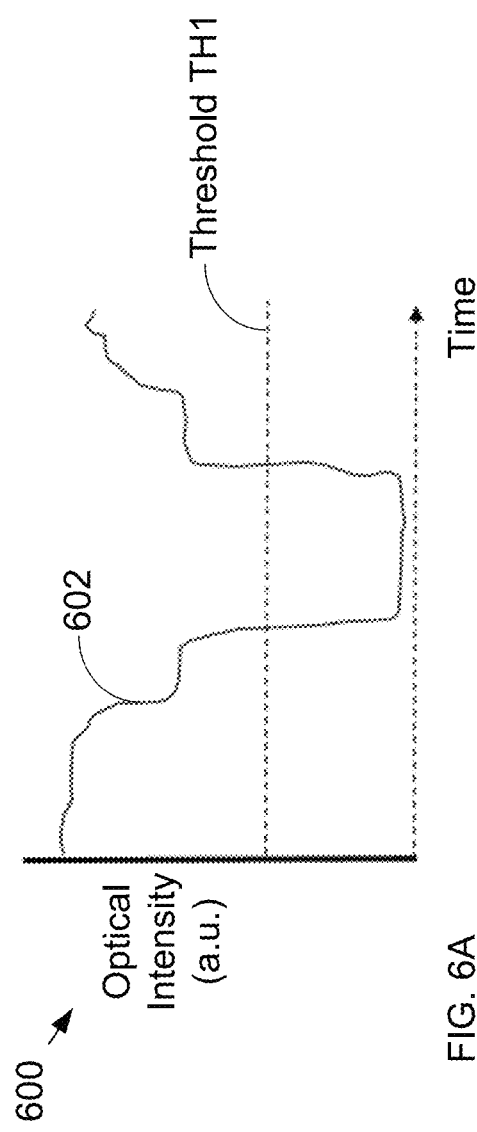
FIG. 6A
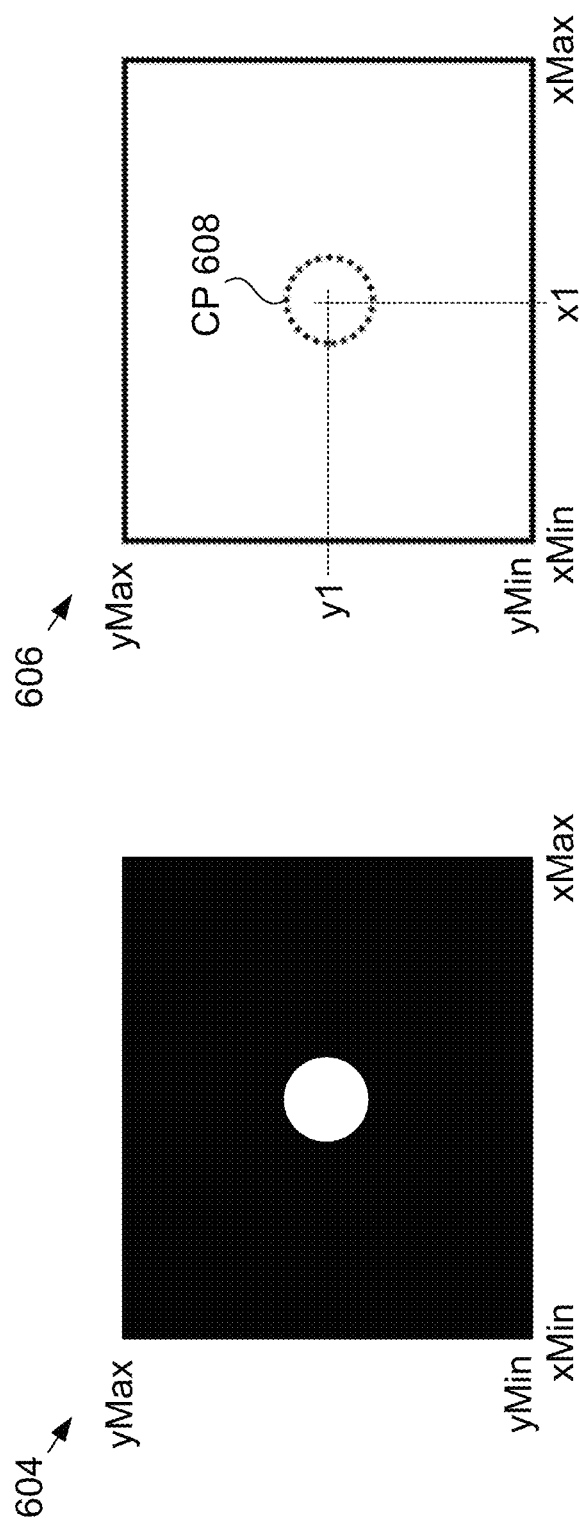
FIG. 6B
FIG. 6C

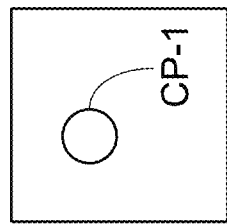 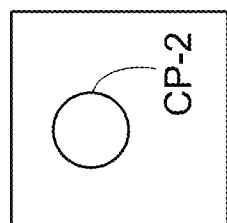 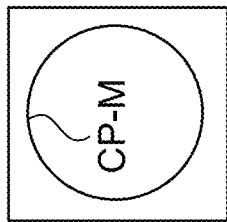
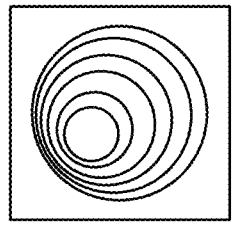
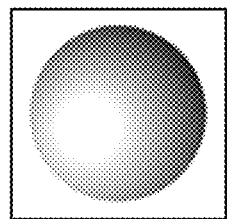
FIG. 8A
CM 802
FIG. 8B
Image 804
FIG. 8C

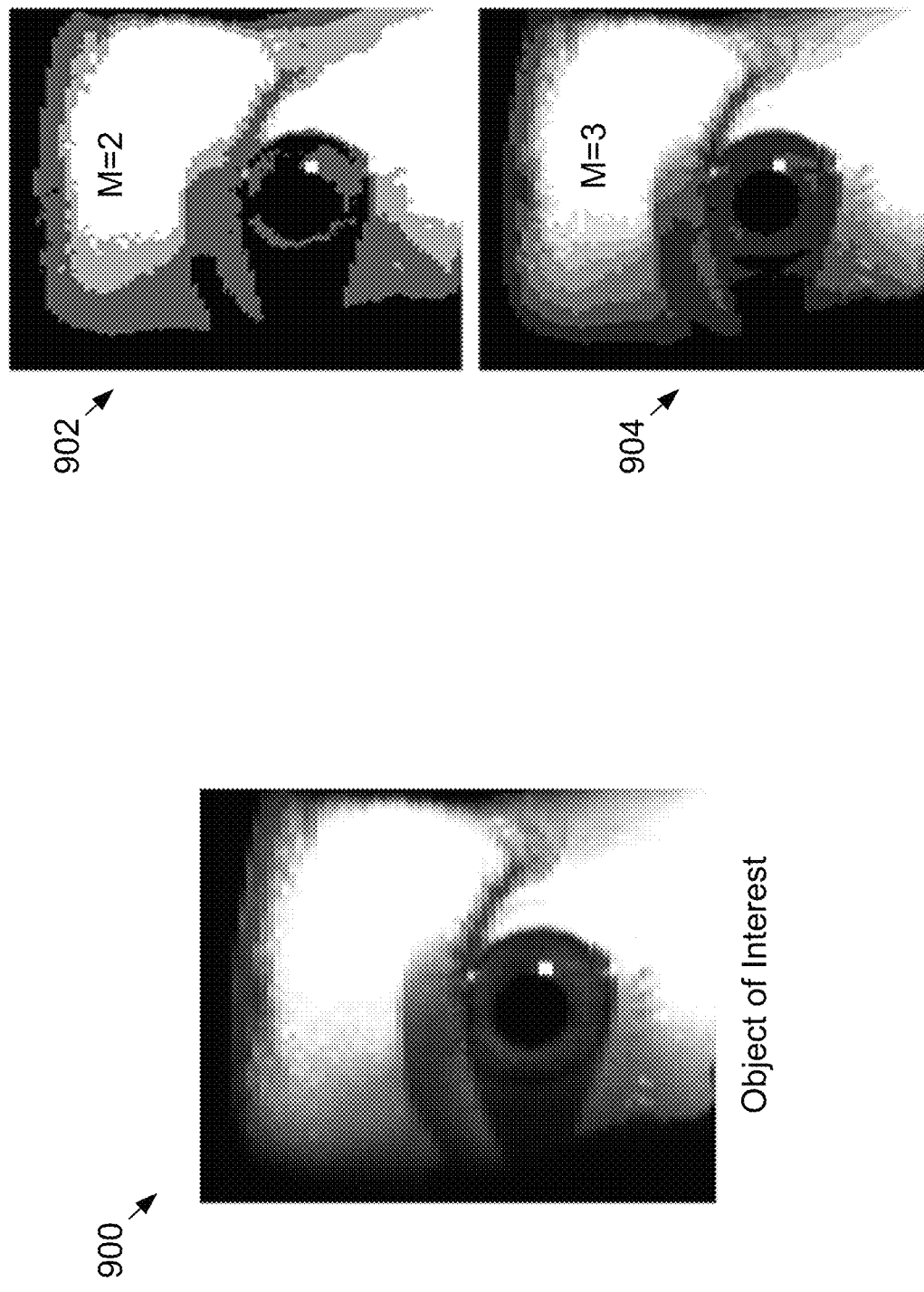

METHODS AND SYSTEMS FOR FORMING IMAGES OF EYE FEATURES USING A NON-IMAGING, SCANNING-MEMS-BASED EYE-TRACKING SYSTEM

CROSS REFERENCE TO RELATED APPLICATIONS

This application is a continuation of U.S. Non-Provisional patent application Ser. No. 17/673,337, filed Feb. 16, 2022, which claims priority of U.S. Provisional Patent Application Ser. No. 63/150,312, filed Feb. 17, 2021, each of which is incorporated herein by reference. It also includes concepts disclosed in United States Patent Publication Nos. 2019/0204912 published 4 Jul. 2019, 2016/0166146 published 16 Jun. 2016, 2017/0276934 published 28 Sep. 2017, and 2021/0124416 published 29 Apr. 2021, each of which is incorporated herein by reference.

TECHNICAL FIELD

This disclosure relates generally to human—computer interfaces and more specifically to eye-tracking systems, methods and structures that advantageously provide real-time measurements of eye-tracking and eye fixations, as well as imaging of features of an eye.

BACKGROUND

Much information about a user can be derived from knowledge of the user's gaze direction, as well as the shape, location, orientation and/or movement of particular features of one or both of the user's eyes.

Historically, such information has been obtained using eye-tracking systems that rely on imaging systems (e.g., cameras, focal-plane arrays (FPA), etc.) for forming an image of one or both eyes and complex image processing to interpret such images. Unfortunately, eye-tracking systems that employ imaging systems are notoriously slow (high-latency), expensive, bulky and require considerable processing power. As a result, they are not well suited for use in many applications.

Given such applicability and importance, improved eye-tracking systems, methods and/or structures that can form images of an eye or one or more of its features, without the use of a conventional imaging system and associated image processing would represent a welcome addition to the art.

SUMMARY

The present disclosure is directed to the formation of an image of a portion of an eye based on information derived using a non-imaging, scanning-MEMS-based eye tracking system. Methods and structures according to aspects of the present disclosure advantageously facilitate the rapid forming of an image of an eye, or features thereof, without the need for a conventional imaging system, such as a camera or focal-plane array, thereby enabling development of gaze-direction estimations and/or ophthalmological measurement instruments for determining geometric and/or other eye features exhibiting a precision and reproducibility unknown in the art. Such determinations advantageously include shape(s), geometry(ies), and motion of eye feature(s) including the cornea, pupil, iris, sclera, eyelid, etc., as well as their respective interfaces.

Systems, methods, and structures providing eye-tracking according to aspects of the present disclosure advantageously facilitate the measurement of subject eye-movements during—for example—psychological or consumer behavior studies and evaluations, neurological examinations, and the like.

In a broad context, systems, methods, and structures according to the present disclosure provide eye-tracking and/or feature imaging by steering a beam of light through the effect of a two-axis, resonant microelectromechanical system (MEMS) beam scanner onto a scan region of the face including the eye. Structures within the scan region, such as corneal surface, pupil, iris, sclera, and/or eyelid are then tracked/imaged by detecting reflections (or the absence thereof) of light from the scan region at one or more discrete detectors.

According to aspects of the present disclosure, a tracked glint (i.e., short flash of reflected light) is detected as large amplitude pulse of narrow width whereas a tracked pupil is detected as an absence of reflected light in a region of a scanned pattern. In some embodiments, one or more discrete detectors are advantageously selected to use a negative threshold for pupil tracking and/or a positive threshold for glint tracking, thereby enabling the discrimination between glint features and pupil features. By judicious selection of the detection threshold, discrimination between regions/features of the eye having different reflectivities can be performed.

Advantageously, a projected scan pattern (Lissajous) is employed that produces a superior spatiotemporal scanning density over the scan region. In some embodiments, the projected pattern is generated such that it precesses, thereby further improving the spatiotemporal scanning density.

Of further advantage, when sufficient number of pulses are detected/collected by the multiple detectors, a contour map of the glint(s) and location(s) of eye features may be obtained.

Still further, by performing multiple scans of the eye with different optical powers and/or different detection thresholds, contour plots of the eye can be generated and used to derive a reflected-intensity map representation of the eye.

In some embodiments, a reflected-intensity map may be obtained by directly sampling the magnitude of the reflected signal from the scanned region by way of an analog to digital converter and mapping the position of the scanned beam to a memory address in a frame buffer and setting the value of the memory address to the measured intensity.

An embodiment in accordance with the present disclosure is an apparatus comprising: a first microelectromechanical system (MEMS) scanner for steering a first input light signal in a two-dimensional pattern over a scan region, wherein the first MEMS scanner has a first scanning axis characterized by a first resonant frequency and a second scanning axis characterized by a second resonant frequency; a detector configuration that is non-imaging and includes at least one discrete detector, wherein the detector configuration is configured to provide a first detector signal based on reflected light from the scan region, the reflected light comprising at least a portion of the input light signal; a comparator configured to provide a first comparator signal based on a first comparison of the first detector signal and a first threshold; and a processor configured to estimate the position of the MEMS scanner and generate a first contour plot based on a spatiotemporal correlation of the first comparator signal and the estimated position of the MEMS scanner over the first time period.

Another embodiment in accordance with the present disclosure is a method comprising: scanning a first input light signal in a two-dimensional scan pattern over a scan region through the effect of a microelectromechanical system (MEMS) scanner that has a first scanning axis characterized by a first resonant frequency and a second scanning axis characterized by a second resonant frequency, wherein the light signal is scanned by driving the first axis with a first periodic signal having a first drive frequency and driving the second axis with a second periodic signal having a second drive frequency; providing a first detector signal based on reflected light from the scan region at a detector configuration that is non-imaging and includes at least one discrete detector, wherein the reflected light comprises at least a portion of the input light signal; generating a first comparator signal based on a first comparison of the first detector signal and a first threshold; and generating a first contour plot based on a spatiotemporal correlation between the first comparator signal and an estimate of the position of the MEMS scanner over a first time period.

BRIEF DESCRIPTION OF THE DRAWINGS

FIG. 6A depicts a plot of output signal 130 over the measured half-scan period of scan pattern 302.

FIG. 6B depicts a two-dimensional map of the output signal of comparator 132.

FIG. 6C depicts a reconstructed pupil signal in accordance with method 500.

FIG. 8A depicts a series of contour plots in accordance with the present disclosure.

FIG. 8B depicts a contour map in accordance with the present disclosure.

FIG. 8C depicts an image of an eye derived by interpolating a contour map in accordance with the present disclosure.

FIG. 9 depicts image plots of a portion of a face reconstructed using different numbers of bits of information in accordance with the present disclosure.

DETAILED DESCRIPTION

Figure 1:
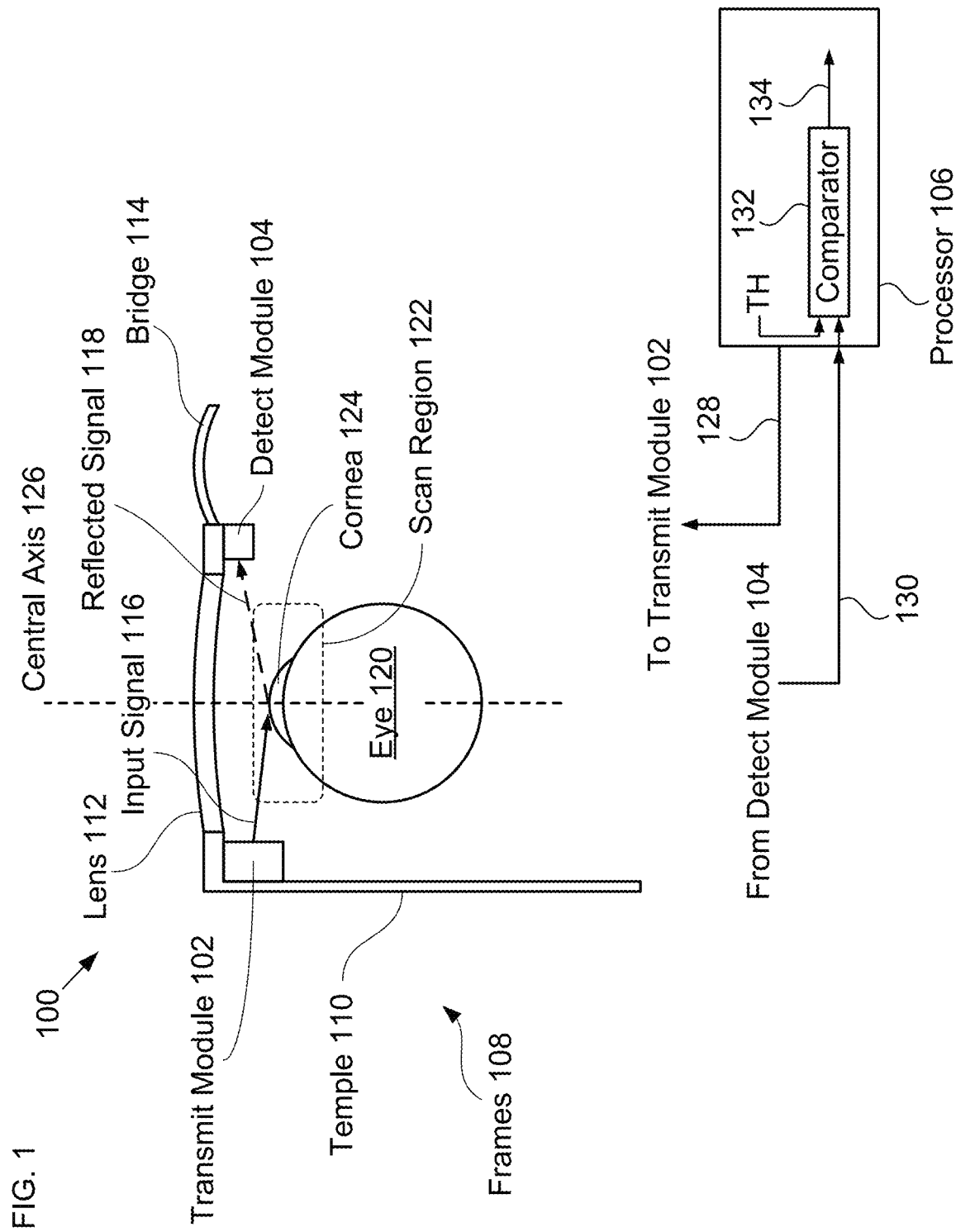
FIG. 1 depicts a schematic block diagram showing an illustrative eye tracking system according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks that may be labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the figures comprising the drawing are not drawn to scale.

As will become apparent to those skilled in the art, systems, methods, and structures according to aspects of the present disclosure advantageously extend the capabilities of eye tracking systems disclosed in U.S. Patent Publication Nos. US2016/0166146 (hereinafter referred to as the '146 publication), US2019/0204912 (hereinafter referred to as "the '912 publication"), and US2021/0124416 (hereinafter referred to as "the '416 publication") which disclosed scanning microelectromechanical systems that determine the position of an eye by directing a beam of light towards the eye and determining the unique angle at which the beam reflects off the cornea of the eye to determine the direction of the gaze of the user. Systems in accordance with the '146, '912, and '416 publications enable eye tracking that can be faster, lower power, more precise, more compact, and lower cost than prior-art video-based systems.

FIG. 1 shows a schematic block diagram illustrating an eye tracking system according to aspects of the present disclosure. As will be apparent to those skilled in the art by inspection of this figure and the following discussions, such illustrative systems constructed according to aspects of the present disclosure advantageously exhibit substantial improvements in size, cost, power consumption, bandwidth and precision as compared with prior art eye-tracking systems.

In broad terms, system 100 includes a transmit module that emits one or more beams of light at controlled angle(s) toward a scan region on the eye being tracked. Through the effect of one or more MEMS scanning micromirrors included in the transmit module, each beam of light is scanned over time, in any pattern on the scan region, but preferably in a Lissajous figure.

The beam of light interacts with one or many object(s) of interest or feature(s) in the environment. Such an object or feature can especially include features such as pupil, iris, cornea, sclera, eyelid, and the like. The object(s) of interest or feature(s) of the environment may change position and/or orientation, or other features, over time. The interaction of the beam of light with the object of interest or feature in the environment may include reflection, retroreflection, transmission, blocking, absorption, polarization change, or any other interaction that alters one or more properties of the beam of light after the interaction.

One or more photodetectors ("detector(s)") measures reflections of the beam of light received from the scan region over time, where the reflections (or lack thereof) arise from the interaction of the beam of light with the one or more objects of interest or features in the scan region.

A detector may include additional electronic circuits to aid in its operations. A detector may be positioned in a package with a scanner. The measurement of the optical signal(s) from the beam(s) of light contains information such as optical intensity, timing information, time of flight, pulse width, modulation frequency, or any other property of the beam(s) of light. The detectors may change their gain, threshold, dynamic range, or any other property related to measuring the beam(s) of light over time. The detector(s) may be powered off or put into a reduced power state for a period of time. Thresholded signals from multiple detectors can be combined using logical operations; OR, NOR, AND, NAND, etc. operations with electronic circuits. Similarly, analog intensity signals from multiple detectors may be combined through analog summing, difference or other arithmetic operations using analog means such as through the use of operational amplifiers.

In some embodiments, the beam(s) of light are optically modulated to improve detectability. In some embodiments, the modulation signal contains digital information. In some embodiments, the optical modulation signal is adjusted over time to, for example, improve detectability. Furthermore, in some embodiments, another aspect of the beam(s) of light is adjusted over time, such optical power, pattern type, size, position, rate, and the like. In some cases, the optical power is reduced to zero and/or the MEMS scanning micromirror module is powered off or put into a reduced power state for some period of time.

The detector(s) may use demodulation to detect a reflection of an optically modulated signal. The demodulation frequency or frequency range may be changed over time. The detectors may decode digital information carried in the modulated beam(s) of light.

The signals produced by the detector(s) and associated electronic circuits are provided to a processor or microprocessor for use in software. An analog to digital converter, or a comparator, or any other process that converts electronic signals to digital information may be used to provide the processor or microprocessor with the optical information.

With specific reference to FIG. 1, illustrative system 100 includes one or more transmit module(s) 102, detect module (s) 104 (that may include multiple individual detectors)—not specifically shown, and processor(s) 106. Note that for simplicity in the drawing, only single module(s) are shown in this illustrative figure. Those skilled in the art will of course appreciate that the number(s) and function(s) of the module(s) are not fixed, and instead may include a plurality of same. Still further, their respective position(s) may likewise be varied from those illustratively shown including spaced-apart relative to one another and/or arranged in a pre-determined or no particular arrangement around—for example—eyeglass frames or goggles or shield or other mechanical support.

Transmit module 102 and detect module 104 are illustratively shown arranged on a rigid support in a fixed orientation relative to an eye 120 of a test subject. As we shall show and describe, system 100 enables tracking of a surface feature (e.g., cornea 124, pupil, iris, sclera, and the like—not specifically shown) within a two-dimensional region of an eye during typical test-subject behavior (e.g., reading, viewing a computer screen, watching television, monitoring a scene, shopping, other consumer activities, responding to stimulus, etc.), and estimating and/or determining the corneal vector of the eye based on the location of the surface feature (and other characteristics). In addition, system 100 can be used to detect other eye features and/or user behavior, such as an eyelid, blink, blink rate, saccade activity, eyelid droop, and the like, that can provide insight into the physical/emotional state of the user.

For the purposes of this Specification, including the appended claims, the "corneal vector" or "gaze vector" of an eye is defined as the gaze direction of the eye. As may be readily appreciated by those skilled in the art, we note that the optical axis of an eye is not the same as a visual axis. More specifically, the optical axis may be substantially aligned—for illustrative example—with an optical centerline of the eye while the visual axis is more substantially aligned with a visual acuity location of the eye, namely the fovea centralis. The fovea is responsible for sharp central vision, which is necessary in humans for activities where visual detail is of primary importance, such as reading and driving. Accordingly, a gaze vector is preferably indicated by a vector extending outward along the visual axis. As used herein and as will be readily understood by those skilled in the art, "gaze" suggests looking at something—especially that which produces admiration, curiosity or interest— among other possibilities.

Transmit module 102 is a sub-system for providing input signal 116 and scanning it in two-dimensions over a scan region 122 of eye 120. Transmit module 102 includes at least one light source for generating light and at least one MEMS scanner for steering the light in two dimensions. Typically, collimating optics are also included in a transmit module or operatively coupled with it such that input signal 116 is received as a substantially collimated light signal at eye 120. Exemplary transmit modules are described in detail in the '146, '912, and '416 publications; however, it should be noted that transmit modules in accordance with the present disclosure are not limited to those disclosed in the '146, '912, and '416 publications.

Furthermore, in some embodiments, the optical path of input signal is folded and/or interacts with an optical element (e.g., a collimating lens, partially collimating lens, off-axis parabola, mirror, metasurface, etc.) prior to the input signal being received at eye 120, as described in U.S. patent application Ser. No. 16/232,410, filed Dec. 26, 2018, which is incorporated herein by reference.

Detect module 104 is a sub-system for receiving light reflected from scan region 122, providing an electrical signal based on the intensity of the reflected light, and detecting—among other possible things—one or more maxima in the electrical signal. Exemplary detect modules are described in detail in the '146, '912, and '416 publications; however, it should be noted that detect modules in accordance with the present disclosure are not limited to those disclosed in the '146, '912, and '416 publications.

As noted previously, while only a single detect module is shown in the illustrative FIG. 1, those skilled in the art will appreciate that more than one detect module may be employed—each having one or more individual detectors included therein. As will become further appreciated, such configurations including multiple detect modules and/or multiple detectors therein, provide additional data/information according to aspects of the present disclosure. We note at this point that the above discussion generally describes the detection of maxima. Advantageously, minima are also possible to detect in the case of the pupil. As we shall further show and describe, systems, methods and structures according to aspects of the present disclosure may detect other optical power levels that can be used to, for example, identify edges of features, feature contours, and the like, which can be more difficult to identify. In such an application, we may advantageously edge outlines of features and fit—for example—ellipses to facilitate their identification.

Processor 106 may be a conventional digital processor and controller (e.g., a microcontroller, microcomputer, etc.) operative for controlling transmit module 102, establishing system timing, and estimating the two-dimensional location of cornea 124 (for example) within scan region 122. In the depicted example, processor 106 includes conventional comparator 132 and communicates with transmit module 102 and detect module(s) 104 via wired connections (not shown) to transmit control signals 128 and receive output signal 130. In some embodiments, processor 106 communicates with transmit module 102 and detect module 104 wirelessly. In some further embodiments, processor 106 is integrated in one of transmit module 102 and detect module(s) 104. Note further that in those embodiments including multiple detector modules there may be multiple output signals 130 communicated with processor. Note further that in those configurations including multiple detectors included as part of a single detector module, the multiple detectors may provide individual, multiple signal lines to the processor as well or may be locally processed by detector module thereby providing a single signal to the processor.

In the depicted, illustrative example, system 100 is mounted on eyeglass frames 108, which includes temples 110, lenses 112, and bridge 114. System 100 is shown mounted on frames 108 such that transmit module 102 and detect module(s) 104 are on opposite sides of central axis 126 of eye 120. Specifically, transmit module 102 is mounted on the frames such that it can scan input signal 116 over the full extent of scan region 122 and detect module(s) 104 is/are mounted on the frames such that it/they can receive a portion of input signal 116 reflected from scan region 122 as reflected signal 118. As noted previously, one or more detect module(s) may include one or more individual detectors which, as we shall show and describe, advantageously provide enhanced performance and informational value for systems, methods, and structures according to the present disclosure as compared with the prior art.

In particular, the specific location(s) of the one or more detect modules including one or more individual discrete detectors may be adjustable on the frame structures such that systems, method, and structures according to the present disclosure may advantageously provide enhanced informational value for a larger portion of the population. We note further that multiple detect modules and or multiple detectors advantageously improve robustness, more accurate eye profiles, geometry determinations, in addition to the improved gaze direction data already noted.

Figure 2A:
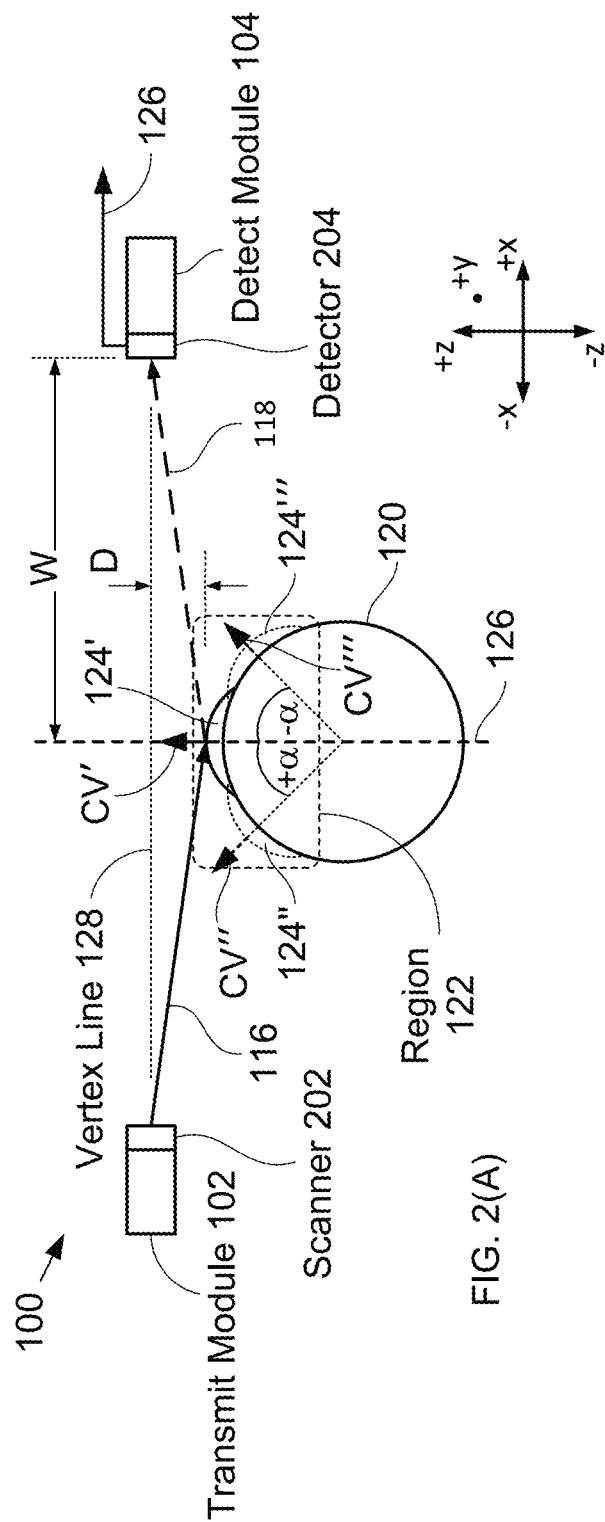
FIG. 2A is a schematic diagram depicting an illustrative geometric arrangement for an eye-tracking system in accordance with the present disclosure.

FIG. 2A is a schematic diagram depicting an illustrative geometric arrangement for system 100. At this point that it is noted that according to one aspect of the present disclosure that there exists a configuration of system 100 that gives rise to a unique point on cornea 124 that results in a maximum intensity in the reflection of input signal 116 (i.e., reflected signal 118) at detector(s) 204 of detect module(s) 104, where detector(s) 204 is/are a discrete detector. For the purposes of this disclosure, including the appended claims, a "discrete detector" is defined as an optoelectronic device having no more than four electrically independent detection regions on a single substrate, where each detection region is operative for providing one electrical signal whose magnitude is based on the intensity of light incident upon that detection region. Examples of discrete detectors include detectors having only one detection region, split detectors having two detection regions, four-quadrant detectors having four detection regions, and position-sensitive detectors. The definition of discrete detector explicitly excludes individual pixels, or groups of pixels, within array devices for collectively providing spatially correlated image information, such as focal-plane arrays, image sensors, and the like. When input signal 116 is aligned with this point, the angular positions of scanner 202 within transmit module 102 are indicative of the location of this point of maximum reflection within scan region 122, which is indicative of the corneal vector for the eye.

As may be observed from FIG. 2A, are position(s) of cornea 124 at three gazing positions namely, (1) gazing straight ahead and aligned with central axis 126, as indicated by cornea 124' and corneal vector CV'; (2) gazing in the extreme positive direction, as indicated by cornea 124" and corneal vector CV"; and (3) gazing in the extreme negative direction, as indicated by cornea 124''' and corneal vector CV'''.

Figure 2B:
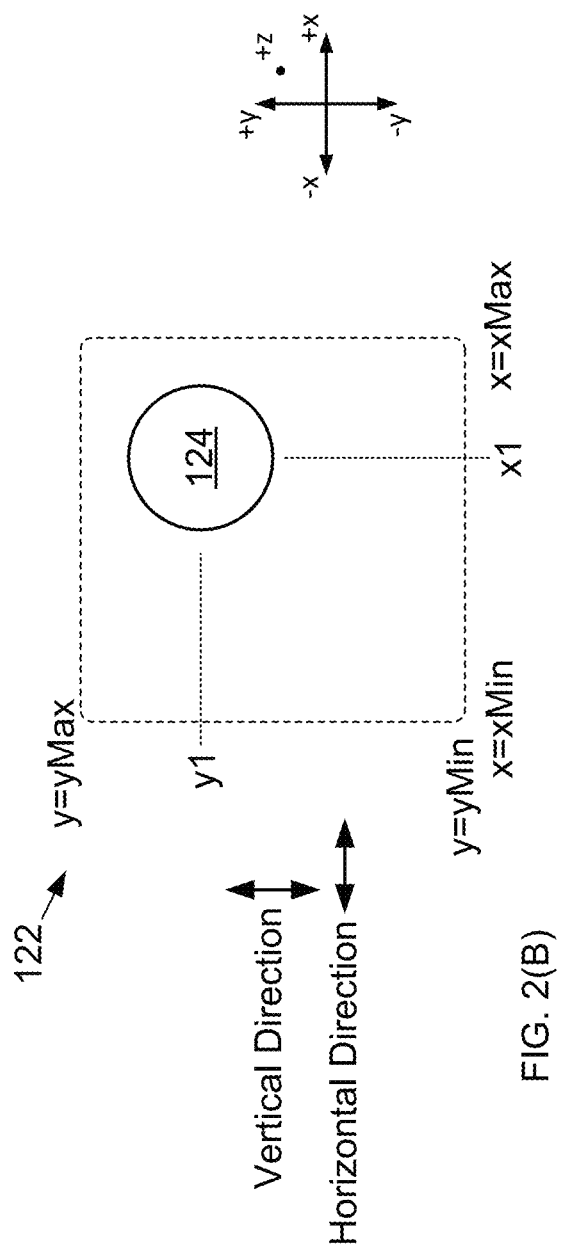
FIG. 2B shows a schematic diagram depicting an exemplary scan region of a subject eye according to aspects of the present disclosure.

Turning now to FIG. 2B, there is shown a schematic diagram depicting an exemplary scan region 122 of a subject eye. As illustratively depicted, scan region 122 extends from x=xMin to x=xMax and from y=yMin to y=yMax in the x- and y-directions, respectively.

During an illustrative eye-tracking operation of system 100, scanner 202 sweeps input signal 116 over scan region 122 in two dimensions. Preferably, scanner 202 is a two-axis, resonant microelectromechanical system (MEMS) beam scanner, examples of which are described in the '146, '912, and '416 publications; however, other two-dimensional scanners can be used in system 100 without departing from the scope of the present disclosure. When the input signal is incident on cornea 124, reflected signal 118 (i.e., the corneal reflection) sweeps over detector 204. We note that during operation, the two-dimensional scan may occur simultaneously i.e., it moves in both directions simultaneously and may be projected onto the eye in a specific pattern to provide enhanced operation. It should be noted that the curvature of the cornea gives rise to a reflective condition that reduces the angle-of-reflection to a narrow range of scanner angles.

The position of the scanner that corresponds to the maximum received intensity at the aperture of detector 204 is then determined based on any of a variety of tracking methodologies described in the '146, '912, and '416 publications, such as tracking maximum intensity, pulse width, pulse leading edge, pulse last edge, and the like. The position of the scanner is then used to calculate the location of the cornea, which is then used to estimate corneal vector CV.

As previously noted, the particular sweep of input signal may advantageously be shaped over scan region(s) such that a desired sweep density is achieved thereby producing a desirable (i.e., greatest) density of received pulses produced by the one or more discrete detectors. While the particular sweep shape is user definable, one particular shape—the Lissajous—produces a surprisingly effective sweep and therefore pulse densities.

Those skilled in the art will appreciate that a Lissajous curve—also known as a Lissajous figure—is the graph of a system of parametric equations defined by x=A sin(at+δ); y=B sin(bt).

Operationally—with systems, methods and structures according to the present disclosure that may advantageously employ MEMS devices, both x, and y axis of the MEMS are driven near their resonant frequencies which advantageously results in enhanced power and mechanical range(s). Of further advantage, a Lissajous curve provides a superior scan pattern for a given surface, as it permits a very fast (in some cases, the fastest) scan speed for a given mechanical system having mechanical bandwidth constraints.

When scanning to determine glints (eye features), one wants to cover a scan area in a reasonably short period of time such that the feature is also located within the reasonably short period of time. As will be further understood and appreciated by those skilled in the art, not all Lissajous curves exhibit the same pattern density, which is a function of the mechanical resonances of the MEMS device employed and the drive frequencies provide to it.

Still further, as discussed in the '416 publication, a scan region can be interrogated with greater density in a shorter period of time by scanning a light signal in a Lissajous scan pattern whose position in the scan region changes over time (i.e., precesses)—preferably at a high rate. Such a scan pattern is generated, for example, by driving each axis of scanner 202 with a periodic signal having a frequency near the resonant frequency of that axis and such that two drive frequencies are related by a ratio that gives rise to a level of precessing that results in a high-density scan pattern in only a few periods of the drive frequencies.

Figures 3A, 3B:
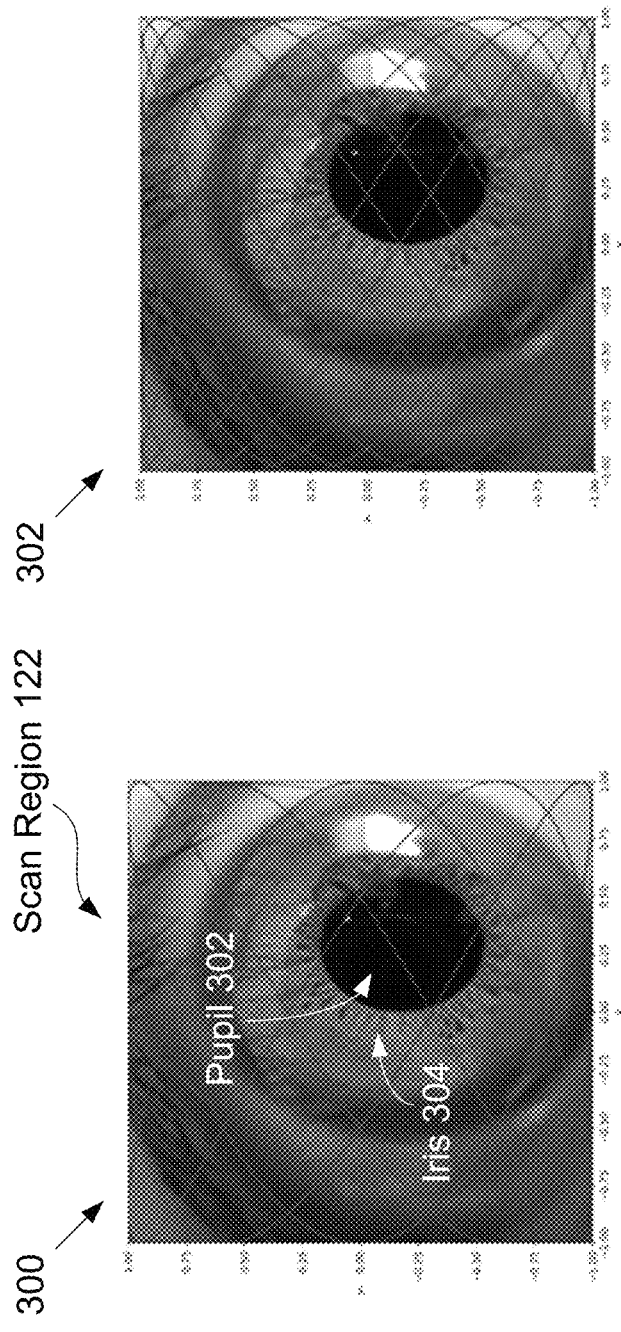
FIGS. 3A-B shows examples of precessing Lissajous curve patterns generated by driving a two-axis, resonant MEMS scanner with drive signals having different drive-frequency ratios according to aspects of the present disclosure.

FIGS. 3A-B shows examples of precessing Lissajous curve patterns generated by driving a two-axis, resonant MEMS scanner with drive signals having different drive-frequency ratios according to aspects of the present disclosure.

Plot 300 shows a Lissajous scan overlaying an image of scan region 122, where the scan region includes pupil 302 and iris 304 of eye 120. The Lissajous scan shown in plot 300 is generated using drive signals having a frequency ratio of 3:5.

Plot 302 shows a Lissajous scan overlaying an image of scan region 122, where the Lissajous scan is generated using drive signals having a frequency ratio of 7:11.

As can be seen from plots 300 and 302, a significant change in the scan density of a Lissajous scan can be realized by changing the ratio of the frequencies used to drive its axes. Here, scan density is defined as the inverse of the largest modulo 2π distance, $D_{max}$, among spatially adjacent pairs of scan lines in phase space, for a given finite sampling time.

Figure 4:
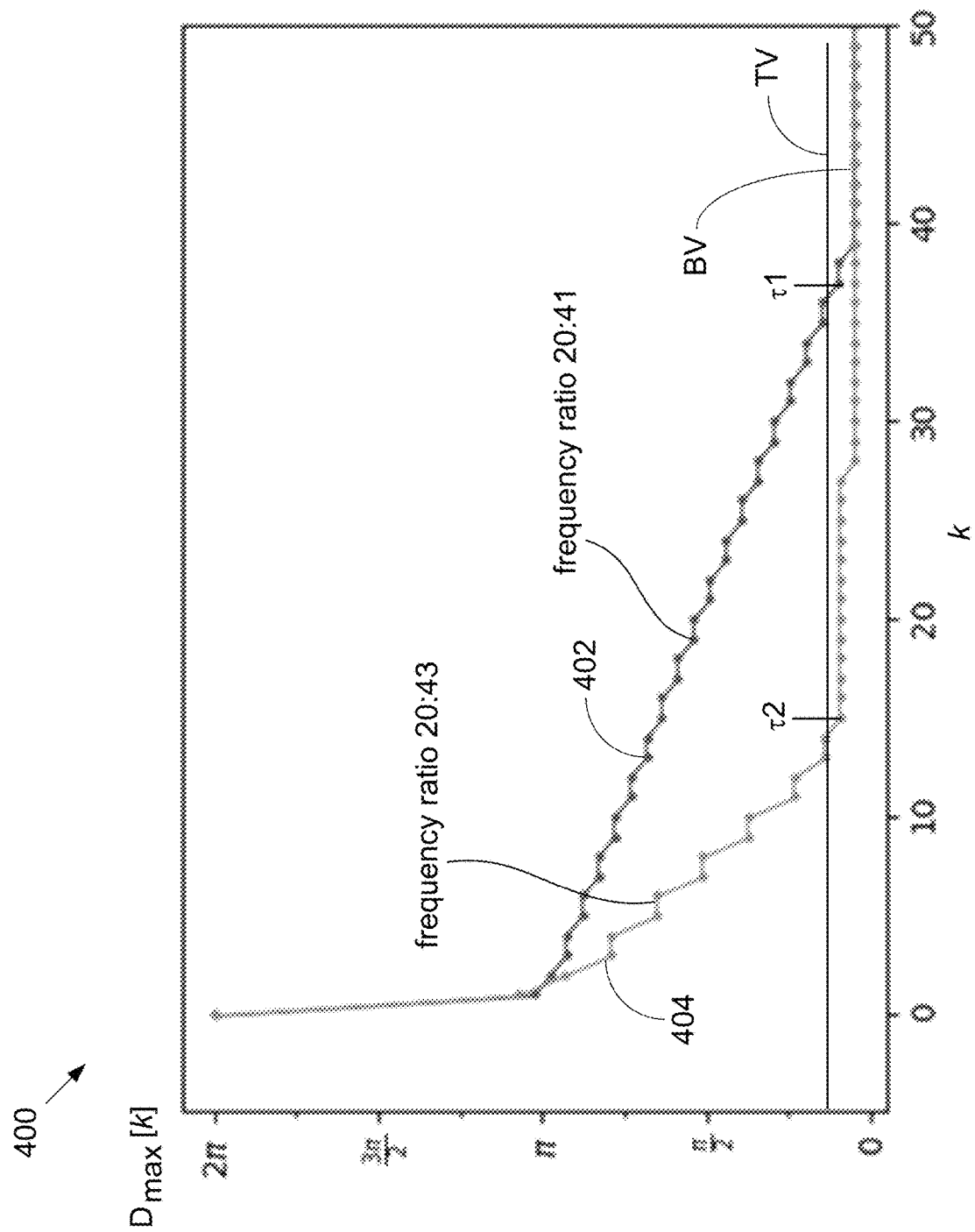
FIG. 4 depicts a plot of scan density of a scan pattern versus the number of drive-signal cycles, k, for two drive signals having different sets of drive frequencies.

FIG. 4 depicts a plot of $D_{max}$ of a scan pattern versus the number of drive-signal cycles, k, for two drive signals having different sets of drive frequencies.

Plot 400 includes traces 402 and 404, which show the progression of the value of $D_{max}$ over successive periods of the lower-frequency drive signal of the drive-signal pair for drive frequencies having 20:41 and 20:43 ratios, respectively.

Each of traces 402 and 404 are characterized by the same baseline value BV, which is equal to approximately π16 in the depicted example. However, the conversion time, τ2, for the test-frequency pair having a ratio of 20:43 (i.e., trace 404) is significantly shorter than the conversion time, τ1, for the test-frequency pair having a ratio of 20:41 (i.e., trace 402). For the purposes of this Specification, including the appended claims, "conversion time" is defined as the time required for the largest modulo 2π distance of a scan pattern to reach a value that differs from its baseline value by less than a desired offset. In the depicted example, the desired offset is equal to π/25; however, any offset value can be used without departing from the scope of the present disclosure.

Specifically, plot 404 shows that the drive-frequency ratio of 20:43 approaches baseline value BV in only 14 cycles of its test drive frequency $f_T1$, reaching this baseline value in only 28 cycles. In contrast, the drive-frequency ratio of 20:41 requires 38 cycles of its $f_T1$ to approach BV and 39 cycles to reach its base value. Alternatively, in some embodiments, threshold value TV is used as a metric in place of baseline value BV, where TV is a user-defined value for any of a wide range of eye-tracker system attributes. This is particularly advantageous when different drive-frequency ratios are characterized by different baseline values. In the depicted example, threshold value TV for a minimum acceptable spatial density for eye-tracking system 100.

As noted above, a Lissajous curve can be described by parametric equations x=A sin(at+δ); y=B sin(bt). It should be noted, however, that the drive signals used to realize a Lissajous curve can also include a DC component that can be controlled in accordance with the present disclosure. As a result, the teachings herein enable the drive signals used to drive scanner 202 to be set/adjusted to pan and/or size the resultant scan pattern as desired. For example, during operation, if a particular glint, or other feature, is detected and subsequently tracked, scanner 202 can be set/adjusted to target or otherwise "zoom in" on that feature or set of features.

Panning to and/or zooming in on a specific sub-region of the scan region can be achieved by adjusting the average power in one or both drive signals provided to scanner 202 to generate a Lissajous pattern. When a glint is being detected while the pattern is being panned, its timing will be offset by an amount corresponding to the shift in the pattern. This timing information may be advantageously used to center the projected pattern around a glint or to position the pattern such that, for example, multiple glints are captured for a given eye (user) with a specific inter-pupil distance (IPD) and eye relief.

The ability to pan and/or zoom to a specific sub-region within a scan region affords embodiments in accordance with the present disclosure with unique and significant advantages over the prior art, such as:

i. enabling the scan resolution to be set to any desired level; or
ii. enabling the scan resolution to be substantially optimized; or
iii. reduced computation cost for identifying the center of a glint or eye feature (e.g., pupil, iris, eyelid, etc.); or
iv. establishing a "center of mass" for a plurality of identified glints by, for example, weighting the identified midpoint of each glint by a feature of its detected pulse (e.g., pulse width, leading edge, trailing edge, etc.); or
v. any combination of i, ii, iii, and iv.

Furthermore, the ability to pan/zoom on a specific region of scanning region 122 enables improved resolution in that region. As a result, it can become possible to identify features that might otherwise be difficult, if not impossible, to detect, such as the iris of the eye. As an added benefit, the scan pattern can be centered so that motion of input signal 116 is fastest in a region having little or no useful information (e.g., the center of pupil 302) but is slower moving in regions of particular interest (e.g., an iris region).

Similarly, any curve parameterized by two periodic signals with different periods that can be separated into independent axes can be represented in the same phase space as a Lissajous curve, and can withstand the same analysis. For example, a Lissajous curve under a geometric coordinate transformation, or a two-axis triangle wave.

It is yet another aspect of the present disclosure that, in addition to tracking the gaze direction of an eye, systems, methods, and structures according to aspects of the present disclosure may advantageously detect reflections resulting from other eye features/structures, such as the edge of pupil 302, the sclera, and the like, which can be used to generate images and/or videos of these features and, in some case, the entire eye and surrounding tissue. Furthermore, other user features and behavior can be detected/tracked, such as blinks, blink rate, eyelid droop, eyelid spasms, etc., which can be indicative of a user's physical or mental condition. For example, such characteristics can indicate fatigue (e.g., while driving, flying, performing surgery, etc.), concussion, inebriation, and the like.

Extraction of eye features from the detector outputs can be performed using electronic circuits and a comparator circuit or comparator operation in software. For systems comprising multiple detectors, their signals can be combined via a summing circuit or summing operation in software. Preferably, these operations are performed before the signal is converted to a digital signal because analog circuitry can, for example, be faster, lower cost, consume less power, and/or have smaller physical size, as compared to a digital signal processor.

As with corneal reflections, such feature/structure reflections may be employed to determine gaze direction and tracking as well. We note that such feature/structure reflections may be quite subtle, and therefore any thresholds must be set sufficiently low so that signals associated with such features/structures are adequately detected and subsequently identified.

In some embodiments, the detection threshold is set at a level that enables detection of the interface between pupil 302 and the tissue surrounding it (i.e., pupillometry). Operationally, systems, methods, and structures according to aspects of the present disclosure determine the shape of pupil 302 from the timings of detection-threshold crossings in any (arbitrary) directions.

Figure 5:
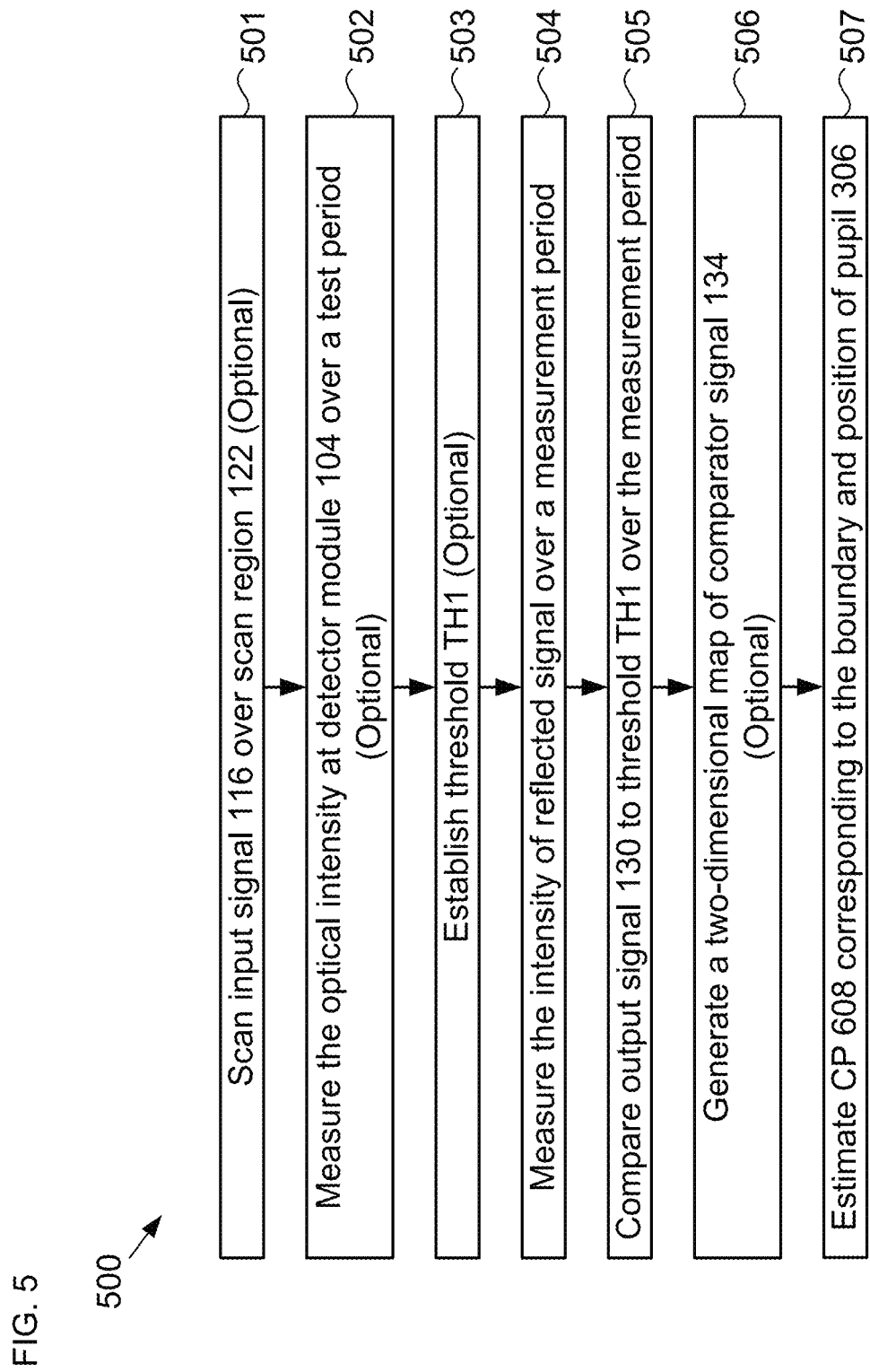
FIG. 5 depicts operations of a method suitable for identifying a thresholded feature according to aspects of the present disclosure.

FIG. 5 depicts operations of a method suitable for identifying a thresholded feature according to aspects of the present disclosure. In the depicted example, the thresholded feature is the pupil of the eye (i.e., pupil 302); however, any feature having sufficient contrast (e.g., a glint, etc.) can be identified using methods in accordance with this disclosure. Method 500 begins with operation 501, wherein input signal 116 is scanned in a two-dimensional pattern over scan region 122. In the depicted example, input signal 116 is scanned using a Lissajous pattern as described above (e.g., scan pattern 302). In some embodiments, a different periodic two-dimensional scan pattern is used to steer input signal 116 about scan region 122. Method 500 is described with continuing reference to FIGS. 1-3, as well as reference to FIGS. 6A-C.

At operation 502, the intensity of reflected signal 118 is measured by at least one detector of detect module 104 over a test period. In the depicted example, the test period is equal to one half of one scan period of scan pattern 302. In some embodiments, the test period is a time period other than a half of one scan period of the scan pattern. In some embodiments, the optical intensity received at more than one detector is measured.

At operation 503, threshold TH1 is established based upon the lowest detected intensity in output signal 130 over the test period.

FIG. 6A depicts a plot of output signal 130 over the measured half-scan period of scan pattern 302. Plot 600 includes trace 602 and threshold TH1.

Trace 602 represents the intensity of reflected signal 118 versus time for the test period. Typically, trace 602 represents signal levels corresponding to specular glints from the cornea, diffuse reflections from the iris, and reflections from other features of the eye. Because a pupil traps nearly all of the light incident upon it, the portion of trace 602 having the lowest value is typically associated with pupil 302. Threshold TH1 is normally established as a level between this value and an intermediate value, such as might be associated with diffuse reflection from the iris.

At operation 504, the optical intensity of reflected signal 118 is measured by detector module 104 over a measurement period. In the depicted example, the measurement period is equal to four full scan periods of scan pattern 302; however, any suitable value can be selected for the measurement period. Typically, the measurement period is selected as a plurality of whole or fractional scan periods of scan pattern 302 that is large enough to provide confidence in the detected features but small enough to mitigate the chance that eye 120 will move during the measurement period. The measured optical intensity of reflected signal 118 is provided to processor 106 as output signal 130.

In some embodiments, a value for TH1 is established prior to implementing method 500. In such embodiments, operations 501 through 503 are not necessary and method 500 begins with operation 504.

At operation 505, comparator 132 provides comparator signal 134 based on a comparison of the magnitude of output signal 130 to threshold TH over the measurement period. In the depicted example, comparator signal 134 is high when the magnitude of output signal 130 is less than threshold TH and low when the magnitude of output signal 130 is equal to or greater than threshold TH. In the depicted example, comparator 132 is included in processor 106; however, the comparator can be located elsewhere in system 100, such in detect module 104, etc.

At optional operation 506, a two-dimensional map of the comparator signal 134 over the measurement period is generated.

FIG. 6B depicts a two-dimensional map of comparator signal 134. Plot 604 is based on a spatiotemporal correlation between comparator signal 134 and the position of scanner 202 over the measurement period, which gives rise to a 1-bit image of the eye (i.e., a single-level contour plot) having only dark and light regions.

At operation 507, contour plot (CP) 608 is generated the position of its center in x,y space is extracted from plot 604. In the depicted example, CP 608 is representative of the perimeter of pupil 302.

In some embodiments, plot 604 is not generated and CP 608 is estimated based a correlation of timing information in comparator signal 134 (e.g., the times of the leading and trailing edges of its output) and the corresponding positions of MEMS scanner 202.

FIG. 6C depicts a reconstructed pupil signal in accordance with method 500. Plot 606 shows the outline of pupil 302 (i.e., CP 608) and calculated centroid (x1,y1) of CP 608.

At this point we note that when attempting pupillometry, the signals are not necessarily low as they are determined by the contrast from pupil to iris. The contrast is actually quite high—although orders of magnitude less than a glint. One significant problem with pupillometry, however, is that of non-uniform illumination/sensitivity across a scan range. In other words, pupillometry is negatively impacted by the non-uniform illumination wherein the path length between scanner and detector varies across the scan range as reflected from the features of the eye. An increased path length drops the detected signal and therefore creates gradients that makes fixed threshold pupil detection difficult.

Advantageously, and according to still further aspects of the present disclosure, one way to overcome this infirmity is to sum the signals from multiple photodetectors such that the average path length of the beam(s) is roughly equal as compared with any signal drop magnitude created by the pupil. Such summing may also be performed in a weighted matter such that the signal is "leveled" against the background. This calibration may occur—for example—when a user has their eyes closed so as to optimize a uniform diffuse reflection signal in the absence of the pupil thus making pupil detection easier.

For example, multiple input signals may be received at the same eye (or other object of interest), where each input signal arrives from a different transmit module at a different orientation, such that multiple unique perspectives of the eye are achieved. The information from the perspective of one input signal may be selected to be used by the software over the other input signals. For example, the eye may be looking toward one transmit module, thereby providing that transmit module the best quality of data to be processed by the circuits and the software. One detector may also be shared by multiple scanners by for example, orthogonally modulating light in time-domain such that the signal source can be determined.

Each eye scanner may have properties that are different than the other eye scanners, including but not limited to their operational wavelengths, scanning speed or frequency, modulation data, modulation frequency, detector gain, optical power, field of view, polarization, and size. The use of different properties may allow for each eye scanner to operate simultaneously without interfering with the others. The use of different properties may allow for unique interactions with the object of interest, such as wavelength absorption, reflectance of the whole or parts of the object of interest, polarizing regions of the object of interest, and more.

Still further, closed-loop control can be implemented to address non-uniformities associated with illumination and/or MEMS scanner performance. Scanner properties that can be controlled in closed-loop fashion include, without limitation, optical power, scan angles, and scan speed, including reducing any property to zero (off). Detector properties that can be controlled in closed-loop fashion include, without limitation, gain, threshold, bandwidth, and modulation frequency, including reducing any property to zero (off). Furthermore, in some embodiments, the intensity of the light emitted at transmit module 102 is monitored to enable closed-loop control of the intensity of input signal 116.

It should be noted that, although closed-loop control offers advantages in many cases, open loop control can be used without departing from the scope of the present disclosure.

In some embodiments, improved SNR is achieved by periodically turning the light source in transmit module 102 on/off at a high frequency (i.e., a modulation frequency). In such embodiments, detect module 104 includes a detector circuit (e.g., a phase-locked loop, etc.) that is tuned to the modulation frequency of the source, thereby enabling it to pick up the desired signal while rejecting interfering signals.

It is yet another aspect of the present disclosure that the concept of pupillometry can be extended to generate a multi-bit image of an eye by employing a plurality of threshold values against which reflections from the eye are compared. As a result, the teachings of the present disclosure enable generation of a reflected-intensity map that represents an image of an eye without the need for an expensive conventional imaging system, such as a camera or focal-plane array.

Figure 7:
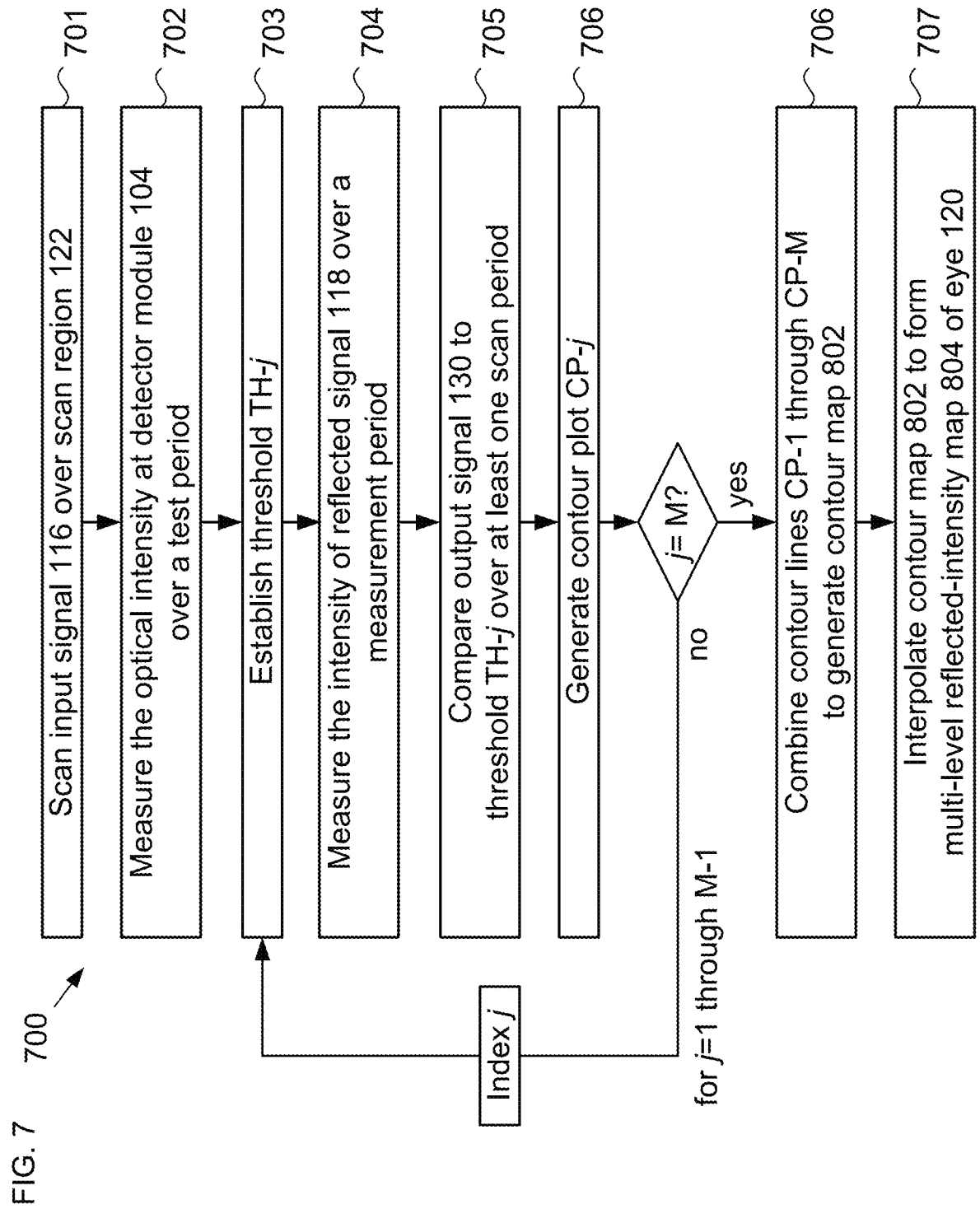
FIG. 7 depicts operations of a method suitable for forming a multi-level reflected-intensity map of an eye in accordance with the present disclosure.

FIG. 7 depicts operations of a method suitable for forming a multi-level reflected-intensity map of an eye in accordance with the present disclosure. Method 700 is substantially an extension of method 500 and begins with operation 701, wherein input signal 116 is scanned in a two-dimensional pattern over scan region 122. In the depicted example, input signal 116 is scanned in a Lissajous pattern over the scan region. Method 700 is described with continuing reference to FIGS. 1-3, as well as reference to FIGS. 8A-C.

At operation 702, the intensity of reflected signal 118 is measured by at least one detector of detect module 104 during at least a half of the scan pattern of input signal 116. In some embodiments, the optical intensity received at more than one detector is measured. In some embodiments, the optical intensity is determined for more than one half of a scan pattern in operation 702.

For each of j=1 through M, where M is based on the desired dynamic range in the resultant image:
  i. At operation 703, threshold TH-j is established for comparator 132. Typically, threshold TH-1 is based upon the lowest intensity determined in operation 1102.
  ii. At operation 704, the optical intensity of reflected signal 118 is measured at detector module 104 over a measurement period to give rise to output signal 130. In the depicted example, the measurement period is selected as four full cycles of scan pattern 302.
  iii. At operation 705, output signal 130 is compared to threshold TH-j over the measurement period.
  iv. At operation 706, contour plot CP-j is generated based on the comparison made in operation 705.

If j<M, the value of j is increased by 1 and method 700 returns to operation 703, where a new threshold TH-j is established.

FIG. 8A depicts a series of contour plots in accordance with the present disclosure. Plot 800 depicts contour plots CP-1 through CP-M, which are generated using different threshold values at comparator 132.

After M iterations of operations 703 through 706, method 700 continues with operation 707 wherein contour plots CP-1 through CP-M are combined into composite contour map (CM) 802, which depicts outlines of regions having substantially the same reflected intensity.

FIG. 8B depicts a contour map in accordance with the present disclosure. Contour map 802 comprises contour plots CP-1 through CP-M.

At operation 707, software interpolation is used to generate multi-level reflected-intensity map 804 from CM 802. In some embodiments, the software interpolation is a simple linearization of reflected-intensity values between contours.

FIG. 8C depicts an image of an eye derived by interpolating a contour map in accordance with the present disclosure. It should be noted that the image is a multi-level reflected-intensity map 804 of eye 120.

FIG. 9 depicts image plots of a portion of a face, based on multi-level reflected-intensity plots reconstructed using different numbers of bits of information in accordance with the present disclosure.

Object 900 is a portion of the face of a user, which includes one of the user's eyes, with a high number of bits of information.

Image 902 is an image of object 900 reconstructed via method 700, where M=2 (i.e., with two bits of information).

Image 904 is an image of object 900 reconstructed via method 700, where M=3 (i.e., with three bits of information).

It should be noted that imaging approaches in accordance with the present disclosure are not limited to eye scanning and can be used to capture contour maps of a wide range of objects of interest, such as facial features, inanimate objects, and the like.

In some embodiments, some or all of the operations of method 700 are sequentially repeated over a period of time to generate a contour-map video of scan region 122.

In some embodiments, a contour map is generated by varying a different system parameter (e.g., the intensity of input signal 116 and/or the gain of the detector(s) of detect module 104) while keeping the threshold employed by comparator 132 fixed. in some embodiments, the threshold remains fixed while is varied in operation 703. Furthermore, in some embodiments the variation applied to the threshold/ system parameter is varied according to a periodic function, thereby obtaining continuous multi-bit information about the scan region.

Although system 100, as described herein, includes a single transmit module that provides only one input signal, in some embodiments, multiple MEMS scanners, each providing a different input signal are used with multiple detectors to augment the capabilities of an eye-tracking system. For example, three-dimensional sensing is enabled by the use of two or more input signals in conjunction with a plurality of detectors. Preferably, the scanners that provide the input signals are positioned such that they are apart at a reasonably high angle, which enables an image or video obtained at each scanner's perspective can be correlated through software techniques to determine the 3D location of an object of interest and/or its features (e.g., an eye and its iris, pupil, cornea, lid, etc.). This correlation may easily be determined on the pupil and the cornea, because the pupil is typically the darkest feature in the image, while the corneal glint(s) are often the brightest. Thus, the minimum and maximum intensity locations in each image serve as points for correlation. The 3D location information is useful for quick and lightweight calculation of the location and orientation of the eye (the gaze angle in particular).

It is yet another aspect of the present disclosure that a single-bit quantizer can be used to generate a multibit reflected-intensity map by performing a successive approximation method to determine the value of each "pixel" in the image (i.e., each location of the scan pattern in scan space whose value is to be determined.

In one nonlimiting exemplary approach, the successive approximation method is successive approximately ADC method comprising a binary search that is initialized by starting with an image table populated with a mid-scale value (128, for example, in an 8-bit unsigned scale) for each pixel. As the beam traverses scan region 122 in a Lissajous pattern, at each pixel, a digitized value of the intensity of input signal 116 is compared to its current magnitude in the image table.

If the result of the comparison is high, a binary step up is taken for that pixel value in the image table. As the beam traverses scan region 122, each pixel is interrogated once per scan and is not re-interrogated until the Lissajous pattern returns to its location.

For example, the magnitude of a given pixel with an unsigned 8-bit value of 177 would proceed through the following sequence of interrogations: 128, 192, 176, 184, 180, 178, 177. An error of up to 1 least-significant bit (LSB) is expected and so extra single stepping may be added for interpolation or averaging depending on the SNR of the pixel or drive/sense system.

Each pixel is interrogated once per Lissajous frame and requires only N interrogations per bits of depth. The sampling period of the ADC must be at least as fast as the traversal time of the beam across a pixel site and the resolution of the DAC setting the intensity of the input signal 116 should at least equal the bit depth of the target image.

In some embodiments, a different successive approximation method, such as counter-type ADC, servo-tracking ADC, and the like, is used.

While any suitable approach to image reconstruction can be used without departing from the scope of the present disclosure, there are some image-construction approaches that offer particular advantages over the prior art. Such advantages arise, in part, from the fact that:

i. MEMS scanner 202 is driven by a periodic signal; therefore, it produces a periodic response having phase values that correspond to the physical configuration of the MEMS scanner;
   ii. Each axis of the MEMS scanner will have a corresponding phase;
   iii. A scanner with N scan axes will scan a M-dimensional physical configuration in space (where M≤N and typically M=N);
   iv. an analog signal in time can be sampled as the scanner is scanned; and
   v. each sample in time corresponds to a position in phase.

Based on the above, examples of preferable image-reconstruction approach can be described as:

Reconstruction:
   i. construct an N-dimensional accumulator array, with entries corresponding to discretized coordinates in phase space;
   ii. map a given signal sample to its position in phase space, which is then accumulated into the accumulator array;
   iii. gather the phase accumulator into a scan-space M-dimensional array (M≤N), representing discretized coordinates in a space which is bijective with the physical configuration of the scanner (e.g., mirror angle space, image space, distortion-corrected image space, etc.); and iv. directly scatter the time-domain signal into the scan space (if the transformation from the phase accumulator to the scan space is adequately simple to compute); OR scatter the time-domain signal into phase space and subsequently gather it into scan space in post-processing. It should be noted that the transformation from phase space to scan space can be encoded in a look up table.

Accumulation:

i. finding the nearest bin and scatter of the time domain signal into the accumulator (whether in phase or scan space); OR ii. replace accumulating with one or more of cumulative averaging, windowed averaging, computation of variance or other measure of spread, or use a kernel (e.g., an anti-aliasing kernel) for accumulating in nearby bins to reduce quantization error.

Sampling:

i. sample at regular time intervals, which correspond to regular increments in phase space;

ii. derive an alternative scatter space, where the scatter space is a linear transformation of the phase space such that the scatter space is cache coherent;

iii. gather the alternative scatter space into phase space or directly into scan space;

iv. invert the nonlinearity of the transformation from phase space to scan space and apply it to modulate the sampling rate to produce samples which are spaced regularly in the scan space;

v. up-modulate the sampling rate (if there is a salient point in the scan space) to produce denser data in the scan space where it is desired (e.g., an iris);

vi. If it's not possible to sample at an adequate rate during a given scan period, the sampling rate can set such that subsequent scan passes produce measurements slightly offset in space, to fill in the holes. Note that this is similar to the effect of setting scan frequencies to produce precessing scans that cover more scan positions over time It is to be understood that the disclosure teaches just some examples of illustrative embodiments and that many variations of the invention can easily be devised by those skilled in the art after reading this disclosure and that the scope of the present invention is to be determined by the following claims.

What is claimed is:

1. An apparatus comprising:
a first microelectromechanical system (MEMS) scanner for steering a first input light signal in a two-dimensional pattern over a scan region, wherein the first MEMS scanner has a first scanning axis characterized by a first resonant frequency and a second scanning axis characterized by a second resonant frequency;
a detector configuration that is non-imaging and includes at least one discrete detector, wherein the detector configuration is configured to measure an intensity of a first reflected light signal from the scan region and provide the measured intensity as a first detector signal, the first reflected light signal comprising at least a portion of the input light signal;
an analog-to-digital converter (ADC) configured to convert the first detector signal into a digital signal; and
a processor configured to estimate the position of the MEMS scanner over a time period and generate an image of the scan region based on a map correlating the estimated position and the digital signal over the time period.

2. The apparatus of claim 1 wherein the processor is further configured to estimate at least one of the size and location of a first feature in the image.

3. The apparatus of claim 1 wherein the scan pattern is a Lissajous pattern.

4. The apparatus of claim 3 wherein the processor is further configured to drive the first scanning axis with a first periodic signal having a first drive frequency and the second scanning axis with a second periodic signal having a second drive frequency, and wherein the first and second drive frequencies give rise to a precession of the Lissajous pattern.

5. The apparatus of claim 1 wherein the first detector signal comprises a combination of a plurality of second detector signals, each of the plurality of second detector signals being based on a different reflected light signal of a plurality of reflected light signals that includes the first reflected light signal.

6. The apparatus of claim 1 wherein the first input light signal is modulated at a modulation frequency, and wherein the detector configuration includes a detector circuit that is tunable to the modulation frequency.

7. A method comprising:
scanning a first input light signal in a two-dimensional scan pattern over a scan region through the effect of a microelectromechanical system (MEMS) scanner that has a first scanning axis characterized by a first resonant frequency and a second scanning axis characterized by a second resonant frequency, wherein the light signal is scanned by driving the first axis with a first periodic signal having a first drive frequency and driving the second axis with a second periodic signal having a second drive frequency;
measuring an intensity of reflected light from the scan region at a detector configuration that is non-imaging and includes at least one discrete detector, wherein the reflected light comprises at least a portion of the input light signal;
providing the measured intensity as a first detector signal;
estimating the position of the MEMS scanner over a time period;
converting the first detector signal into a digital signal at an analog-to-digital converter (ADC); and
generating an image of the scan region based on a map correlating the estimated position and the digital signal over the time period.

8. The method for claim 7 further comprising estimating at least one of the size and location of a first feature in the scan region based on the image.

9. The method for claim 7 wherein the two-dimensional scan pattern is a Lissajous pattern.

10. The method for claim 9 further comprising selecting at least one of the first drive frequency and second drive frequency to give rise to a precession of the Lissajous pattern.

11. The method for claim 7 further comprising:
modulating the first input light signal at a modulation frequency; and
configuring a detector circuit to detect the modulation frequency.

12. An apparatus comprising:
a first microelectromechanical system (MEMS) scanner for steering a first input light signal in a two-dimensional pattern over a scan region, wherein the first MEMS scanner has a first scanning axis characterized by a first resonant frequency and a second scanning axis characterized by a second resonant frequency;

a detector configuration that is non-imaging and includes at least one discrete detector, wherein the detector configuration is configured to provide a first detector signal based a first reflected light signal from the scan region, the first reflected light signal comprising at least a portion of the input light signal; and a processor configured to:

generate a plurality of discretized coordinates that is representative of the scan region;

estimate the position of the MEMS scanner over a time period;

determine a number of pulses for each discretized coordinate of the plurality thereof, wherein each pulse corresponds to a different time at which the detector configuration receives the first reflected light signal from that discretized coordinate during the time period;

producing an accumulator array that correlates the plurality of discretized coordinates within the scan region and the number of pulses determined for each discretized coordinate of the plurality thereof over the time period; and generate an image of the scan region based on the accumulator array.

13. The apparatus of claim 12 wherein the processor is further configured to change the intensity of the first input light signal as it is steered over the scan region.

14. The apparatus of claim 13 wherein the processor is further configured to change the intensity of the first input light by ramping the intensity in linear fashion.

15. The apparatus of claim 12 wherein the plurality of discretized coordinates are determined in phase space.

16. A method comprising:

scanning a first input light signal in a two-dimensional scan pattern over a scan region through the effect of a microelectromechanical system (MEMS) scanner that has a first scanning axis characterized by a first resonant frequency and a second scanning axis characterized by a second resonant frequency, wherein the light signal is scanned by driving the first axis with a first periodic signal having a first drive frequency and driving the second axis with a second periodic signal having a second drive frequency;

providing a first detector signal based on reflected light from the scan region at a detector configuration that is non-imaging and includes at least one discrete detector, wherein the reflected light comprises at least a portion of the input light signal;

generating a plurality of discretized coordinates that is representative of the scan region;

estimating the position of the MEMS scanner over a time period;

determining a number of pulses for each discretized coordinate of the plurality thereof, wherein each pulse corresponds to a different time at which the detector configuration receives the first reflected light signal from that discretized coordinate during the time period;

producing an accumulator array that correlates the plurality of discretized coordinates within the scan region and the number of pulses determined for each discretized coordinate of the plurality thereof over the time period; and generating an image of the scan region based on the accumulator array.

17. The method of claim 16 further comprising changing the intensity of the first input light signal as it is steered over the scan region.

18. The method of claim 17 wherein the intensity of the first input light is changed by ramping the intensity in linear fashion.

19. The method of claim 16 wherein the plurality of discretized coordinates are determined in phase space.

* * * * *